May 9, 1961   M. C. HOOK   2,983,395
BALE LOADER
Filed Oct. 15, 1959   2 Sheets-Sheet 1
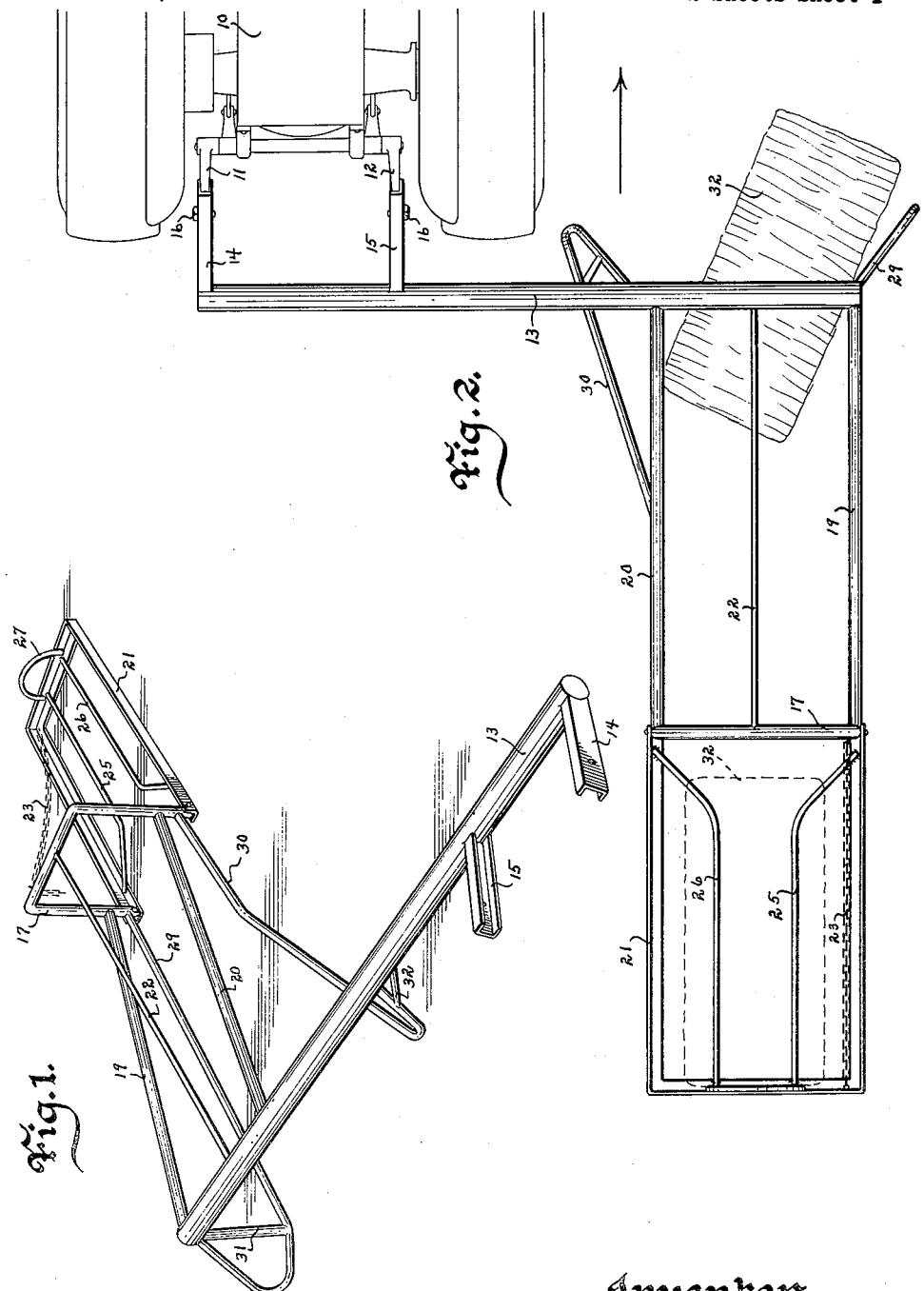
Inventor
Marvin C. Hook
by M. Talbert Dick
Attorney
Witness
Edwin P. Seeley May 9, 1961 M. C. HOOK 2,983,395
BALE LOADER
Filed Oct. 15, 1959 2 Sheets-Sheet 2
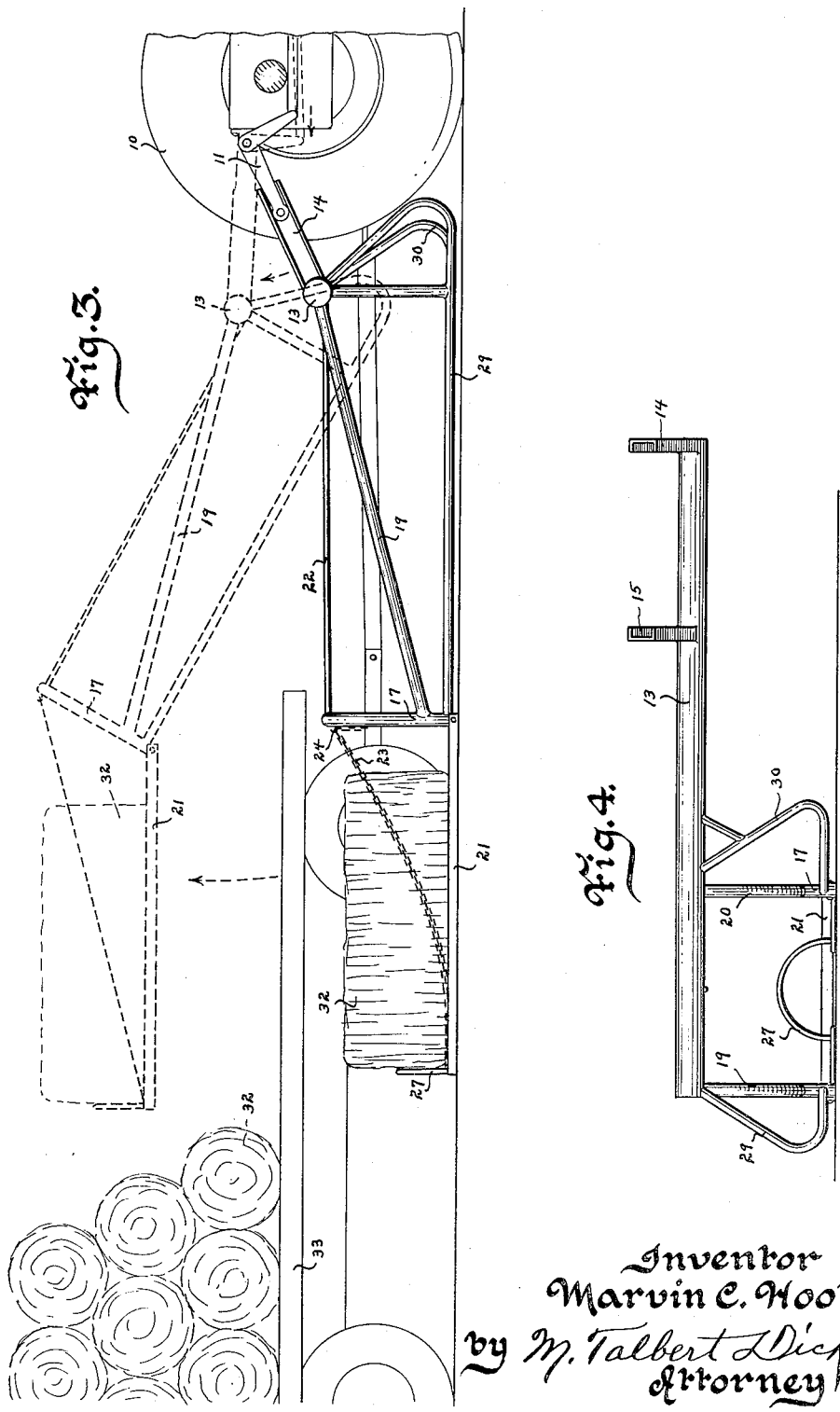
Inventor
Marvin C. Hook
by M. Talbert Dick
Attorney

United States Patent Office 2,983,395
Patented May 9, 1961

2,983,395

BALE LOADER

Marvin C. Hook, Humeston, Iowa

Filed Oct. 15, 1959, Ser. No. 846,712

9 Claims. (Cl. 214—130)

My invention relates to machines for elevating baled agricultural or other products from a surface on which they may be resting to a predetermined altitude for placement on a hauling vehicle. Specifically I have invented an extraordinarily simple bale elevator and a bale guide that permits the loading of bales by the machine regardless of the altitude of the bale after it is discharged from the baling machine.

As bales of agricultural products, such as hay, emerge from a baling machine, some bales fall flat on one side or even on edge. Those that fall on a side are not infrequently disposed at an angle to the line of travel of a bale loading machine and wagon or like conveyance being towed over the field to pick up the bales. In the event a bale is out of alignment, the operator of the loading device is usually faced with a dilemma. Either the operator must maneuver the loading unit or the bale must be straightened to enter the elevator of the loader. Obviously, therefore, either more man power is necessary or excessive maneuvering of the equipment is involved. If the bale is on end or on edge and also crosswise to the line of travel of the loader, the difficulties already discussed are multiplied.

Other common shortcomings of field elevator equipment at present are the bulk, awkwardness of operation, and cost. Most such devices require a broad moving endless chain or belt arrangement.

Therefore one of the principal objects of my invention is to provide a highly efficient simple bale loading device that has no bale elevating belts or elevating chains.

A further object of this invention is to provide a bale loader having a guiding element at its forward lower end that permits the proper alignment of bales for entry into the elevator portion of the bale loader.

A still further object of my invention is to provide a bale loader that is light in weight.

Still further objects of my invention are to provide a hay or like bale loader that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my bale loader detached from a tractor;

Fig. 2 is a top plan view of my device installed on a tractor and in use;

Fig. 3 is a side view of my bale loader with broken lines to more fully illustrate its operation; and Fig. 4 is a front end view of my bale loader.

In these drawings I have used the numeral 10 to generally designate an ordinary farm tractor having the usual hydraulic spaced apart lifting arms 11 and 12. It is to such a tractor that I install my bale loader and which I will now describe in detail.

The numeral 13 designates a beam adapted to extend transversely of the longitudinal axis of the tractor as shown in Fig. 2. On the inner end portion of the beam 13 are two forwardly extending spaced apart arms 14 and 15, C-shaped in cross section with their open sides facing each other as shown in Fig. 1. To attach my bale loader to the tractor, the forward end areas of these two arms 14 and 15 embrace, respectively, the rear end areas of the lifting arms 11 and 12, and are secured thereto by bolts 16. The numeral 17 designates an inverted vertical U-member. This U-member is secured to and at the rear of the beam 13 by two elongated spaced apart bars 19 and 20. These two bars are secured to the lower portions of the two vertical sides of the inverted U-member as shown in Fig. 3. The numeral 22 designates a brace rod extending from the top of the inverted U-member to the beam 13. The numeral 21 designates a horizontal U-member having its two ends extending forwardly and pivotally hinged to the two bottom ends, respectively, of the inverted vertical U-member 17. This horizontal U-member is of angle iron and has a chain 23 extending from its rear end and which is selectively connected at its forward end portion in a hook 24 on the top portion of the inverted U-member 17. The numerals 25 and 26 designate two bale supporting rods. These two rods are spaced apart, have their rear ends secured to the rear center of the horizontal U-member 21, extend forwardly and parallel to each other a substantial distance and then spread forwardly and away from each other to engage the two forward end portions of the horizontal U-member 21 as shown in Fig. 1. The numeral 27 designates a vertical circular bale stop on the rear center of the horizontal U-member 21. The two bale guide rod wings are generally designated by the numerals 29 and 30. These two guide rods have their rear ends secured to the two lower ends, respectively, of the vertical inverted U-member 17 and for a distance extend forwardly and parallel with each other. Then these two guide rods near their forward ends spread apart until they reach positions under and beyond the beam 13 at which points they are each curved forwardly, then upwardly and then rearwardly to engage and be secured to the beam 13 as shown in Fig. 4.

The guide rod 30 and which is the one nearest the tractor starts to extend forwardly and laterally substantially mid-way of its length while the guide rod 29 remains straight until it reaches the vicinity of the beam 13 as shown in Fig. 2. These guide rods may have strengthening braces 31. The numeral 32 designates hay or like bales. The bale receiving wagon is designated by the numeral 33.

The practicable operation of the device is as follows: The lifting arms 11 and 12 of the tractor are lowered to bring the loader into an effective lowered position adjacent the ground surface as shown in Fig. 3. In such a position the two spaced apart bale guide rod wings 29 and 30 will be at the right rear of the tractor as shown in Fig. 2. By moving the tractor forwardly the bale 32 will be guided between the two rod wings 29 and 30 and also between the two bars 19 and 20. The chain 23 will not be tight inasmuch as the horizontal U-member 21 will be dragging on the ground surface. The now straightened bale will pass under the inverted vertical U-member 17 and onto the support rods 25 and 26. Next the hydraulic arms 11 and 12 of the tractor are elevated thereby bringing the device into an elevated position at the side of the wagon 33 as shown by broken lines in Fig. 3. The chain 23 will limit the downward swinging action of the member 21 and the length of the chain between that member and the hook 24 should be so adjusted that when the device is elevated the member 21 will be substantially in a horizontal plane. The chain adjustment provides for this horizontal attitude at various desired unloading elevations. With the bale in an elevated position, it is easily grasped and placed onto the wagon 33. The device is then lowered to receive the next bale to be elevated. It will be noted that to detach my bale loader from the tractor it is merely necessary to remove the bolts 16.

Some changes may be made in the construction and arrangement of my bale loader without departing from the real spirit and purpose of my invention, and it is my intention to cover by my claims, any modified forms of structure or use of mechanical equivalents which may be reasonably included within their scope.

I claim:

1. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, an inverted vertical U-member to the rear of said beam, bars extending between the sides of said inverted U-member and said beam, a horizontal U-member to the rear of said inverted U-member having its two ends hinged to the two ends, respectively, of the said inverted U-member, bale supporting rods in said horizontal U-member, and a chain extending between the rear end of the horizontal U-member and the upper end of said inverted U-member; said horizontal U-member remaining substantially horizontal at all times; said chain adjustably holding said horizontal U-member in substantially a horizontal attitude when in an upward unloading position.

2. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, an inverted vertical U-member to the rear of said beam, bars extending between the sides of said inverted U-member and said beam, a horizontal U-member to the rear of said inverted U-member having its two ends hinged to the two ends, respectively, of the said inverted U-member, bale supporting rods in said horizontal U-member, and an adjustable chain extending between the rear end of the horizontal U-member and the upper end of said inverted U-member.

3. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, an inverted vertical U-member to the rear of said beam, bars extending between the sides of said inverted U-member and said beam, a horizontal U-member to the rear of said inverted U-member having its two ends hinged to the two ends, respectively, of the said inverted U-member, bale supporting rods in said horizontal U-member, a chain extending between the rear end of the horizontal U-member and the upper end of said inverted U-member, and a bale stop means on the rear central area of said horizontal U-member.

4. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, an inverted vertical U-member to the rear of said beam, bars extending between the sides of said inverted U-member and said beam, a horizontal U-member to the rear of said inverted U-member having its two ends hinged to the two ends, respectively, of the said inverted U-member, bale supporting rods in said horizontal U-member, a chain extending between the rear end of the horizontal U-member and the upper end of said inverted U-member, and a guiding rod means associated with said frame for directing a bale onto said bale supporting means.

5. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, an inverted vertical U-member to the rear of said beam, bars extending between the sides of said inverted U-member and said beam, a horizontal U-member to the rear of said inverted U-member having its two ends hinged to the two ends, respectively, of the said inverted U-member, bale supporting rods in said horizontal U-member, a chain extending between the rear end of the horizontal U-member and the upper end of said inverted U-member, and a guiding rod means associated with said frame for directing a bale onto said bale supporting means; said guiding rod means having two spaced apart wing portions with the forward end portion of each wing extending forwardly and laterally away from the other wing portion.

6. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, an inverted vertical U-member to the rear of said beam, bars extending between the sides of said inverted U-member and said beam, a horizontal U-member to the rear of said inverted U-member having its two ends hinged to the two ends, respectively, of the said inverted U-member, bale supporting rods in said horizontal U-member, a chain extending between the rear end of the horizontal U-member and the upper end of said inverted U-member, and a guiding rod means associated with said frame for directing a bale onto said bale supporting means; said guiding rod means having two spaced apart wing portions extending between said inverted U-member and said beam with the forward end portion of each wing extending forwardly and laterally away from the other wing portion.

7. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, a frame means extending rearwardly from said beam, a horizontal bale supporting means on the rear end portion of said frame means, and guiding rod means associated with said frame capable of directing a bale onto said horizontal bale supporting means; said horizontal bale supporting means being in substantially its same horizontal position when in an elevated unloading position.

8. In a bale loader adapted to be actuated by a tractor having lifting arms, a beam adapted to extend transversely of the longitudinal axis of the tractor to which it is adapted to be connected, two arms extending forwardly from said beam and adapted to be secured to the two lifting arms, respectively, of a tractor, a frame means extending rearwardly from said beam, a horizontal bale supporting means on the rear end portion of said frame means, and forwardly flaring guiding rod means associated with said frame capable of directing a bale onto said horizontal bale supporting means; said horizontal bale supporting means being in substantially its same horizontal position when in an elevated unloading position.

9. In a bale loader adapted to be actuated by a tractor having lifting arms, a beam adapted to extend transversely of the longitudinal axis of the tractor to which it is adapted to be connected, two arms extending forwardly from said beam and adapted to be detachably secured to the two lifting arms, respectively, of a tractor, a frame means extending rearwardly from said beam, a horizontal bale supporting means on the rear end portion of said frame means, and guiding rod means associated with said frame capable of directing a bale onto said horizontal bale supporting means; said horizontal bale supporting means being in substantially its same horizontal position when in an elevated unloading position.

References Cited in the file of this patent

UNITED STATES PATENTS 2,755,944    Wetz  ------------------ July 24, 1956